United States Patent [19]
Tanaka et al.

[11] Patent Number: 5,019,865
[45] Date of Patent: May 28, 1991

[54] IMAGE PROCESSING APPARATUS WHEREIN VIBRATIONS ARE USED TO DESIGNATE A PORTION OF AN IMAGE TO BE REPRODUCED

[75] Inventors: Atsushi Tanaka, Kawasaki; Kiyoshi Kaneko, Yokohama; Yuichiro Yoshimura, Tokyo, all of Japan

[73] Assignee: Canon Kabushiki Kaisha, Tokyo, Japan

[21] Appl. No.: 449,053

[22] Filed: Dec. 18, 1989

Related U.S. Application Data

[63] Continuation of Ser. No. 121,040, Nov. 16, 1987, abandoned.

[30] Foreign Application Priority Data

Nov. 20, 1986 [JP] Japan .................................. 61-275107

[51] Int. Cl.$^5$ .......................................... G03G 15/00
[52] U.S. Cl. .................................... 355/218; 355/230; 355/231; 178/18
[58] Field of Search ............... 355/271, 218, 230, 231; 178/18

[56] References Cited

U.S. PATENT DOCUMENTS

| | | | |
|---|---|---|---|
| 3,857,022 | 12/1974 | Rebane et al. | 178/18 X |
| 4,256,400 | 3/1981 | Komori et al. | 355/14 SH |
| 4,475,239 | 10/1984 | van Raamsdonk | 382/57 |
| 4,582,417 | 4/1986 | Yagasaki et al. | 355/7 |
| 4,665,282 | 5/1987 | Sato et al. | 178/18 |
| 4,745,491 | 5/1988 | Kishi et al. | 355/7 X |

FOREIGN PATENT DOCUMENTS

| | | | |
|---|---|---|---|
| 0069196 | 1/1983 | European Pat. Off. | |
| 14978 | 1/1982 | Japan | 178/18 |
| 1088033 | 4/1984 | U.S.S.R. | 178/18 |
| 2042726A | 9/1980 | United Kingdom | |

*Primary Examiner*—Arthur C. Prescott
*Attorney, Agent, or Firm*—Fitzpatrick, Cella, Harper & Scinto

[57] ABSTRACT

In an image processing apparatus having a designator for designating an area of a document image and a processor for carrying out a predetermined process to the designated area when the document image is input, the document image area designator has a document table at an image input unit, made of a transparent and vibration-transmitting plate, and a coordinate input device for detecting coordinates of a vibration input point by detecting vibration applied to the document table, by vibration sensors arranged in the document table.

9 Claims, 3 Drawing Sheets

IMAGE PROCESSING APPARATUS WHEREIN VIBRATIONS ARE USED TO DESIGNATE A PORTION OF AN IMAGE TO BE REPRODUCED

This application is a continuation of application Ser. No. 07/121,040 filed Nov. 16, 1987, now abandoned.

BACKGROUND OF THE INVENTION

1. Field of the Invention

The present invention relates to an image processing apparatus, and more particularly to an image processing apparatus which has means for designating an area of document image and which carries out a predetermined process to the area designated by the designation means when the document image is input.

2. Related Background Art

An image processing apparatus which has an edit function such as partial reproduction by designating a reproduction area by a combination of a copying machine and coordinate input means such as a digitizer pad has been known.

FIG. 4 shows a prior art apparatus of this type. Numeral 22 denotes a digitizer pad for designating an area on a document image. It is arranged on a pressure plate 21 for pressing the document sheet at a document read station on a main body 24 of the apparatus. Data to the digitizer pad 22 is input by an input pen 23.

The apparatus reads the document image set in the image reader by a digital read system by using electrographic system or CCD sensor, and reproduces the read image onto a copy sheet. In the digital reading, not only the reproduction but also reading and storing of the image data are performed.

In order to designate an area of the reproduced image to be edited, an edit mode is selected by actuating a switch on a console panel, and the document sheet is placed face-up at a predetermined position on the digitizer pad 22.

The area on the document sheet to be edited is designated by the input pen 23 and coordinates thereof are input to the pad 22. Then, the pressure plate 21 is lifted upward, the document sheet is placed face-down at the reader and the reproduction is started.

In this manner, the reproduction operation including editing such as partial reproduction of the document is carried out.

However, since the designation of the area of the document sheet and the subsequent reproduction operation require lifting up and lowering the pressure plate 21, the manipulation of the pressure plate 21 is necessary, and the operation is very troublesome.

In those cases where the digitizer is available as a separate optional unit, a cost for the facilities of image processing is very high if a user wishes to have such an edit function.

SUMMARY OF THE INVENTION

It is an object of the present invention to provide an image processing apparatus which can designate a reproduction area by designating an area on a document table.

It is another object of the present invention to provide an image processing apparatus for processing data derived through a transparent member, which can designate an area on the transparent member.

DETAILED DESCRIPTION OF THE PREFERRED EMBODIMENTS

Now the present invention will be clarified in detail by embodiments thereof shown in the attached drawings.

Figure 1:
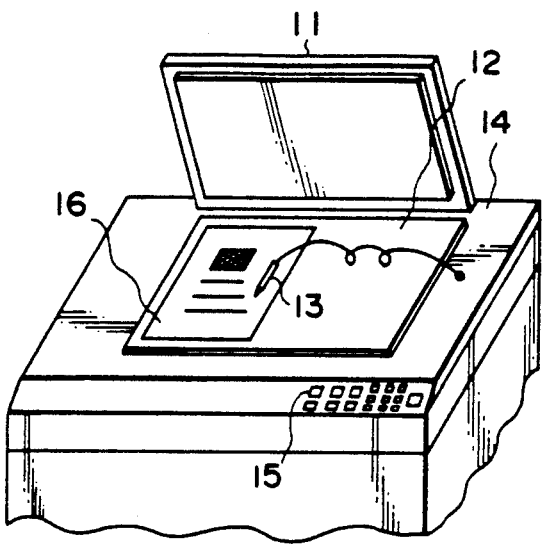
FIG. 1 shows an image input unit of an image processing apparatus of the present invention.

FIG. 1 shows an image processing apparatus in accordance with the present invention. A document table (original set-up plate) 12 is arranged on an image input unit at a top of a main body 14. An image of a document sheet 16 is read through the transparent document table 12 by an image input unit of a predetermined type. The document sheet 16 is pressed to the document table 12 of the image input unit by a pressure plate 11 when the document image is read.

The document table 12 functions not only as a document table of the image reader but also as a tablet for designating an image area on the document sheet by inputting coordinates of desired points on the document table 12 by an input pen 13. In the present embodiment, the coordinates of the designated area by the input pen 13 are detected by a configuration shown in FIG. 2.

Figure 2:
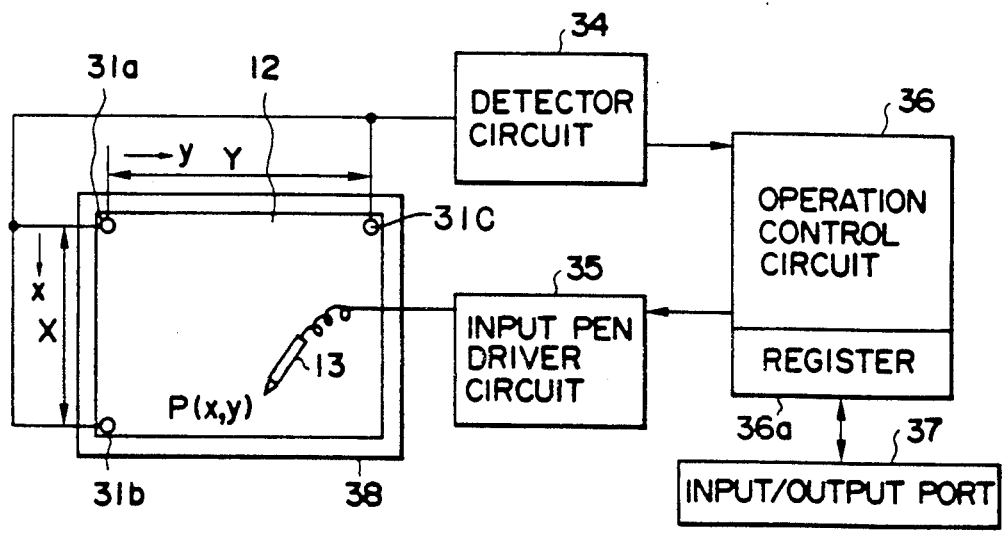
FIG. 2 shows a coordinate input unit used with the unit of FIG. 1.

In FIG. 2, numeral 12 denotes the document table which is made of transparent and vibration-transmitting material such as glass or acrylics. On the other hand, the input pen 13 has a vibrator such as a piezoelectric element therein, which is driven by a pen driver 35 in synchronism with coordinate detection to be described later. The vibration generated by the input pen 13 is input to a desired position on the document table 12 through a vibration amplifying horn at a tip end of the input pen 13.

The direction of vibration of the vibrator of the input pen 13 is set such that it applies a vibration substantially perpendicularly to the text table 12 to generate an elastic plane wave in the document table 12. By transmitting the vibration by the plane wave, impedance of transmission of the vibration due to scratches of the document table 12 or the document sheet 16 is prevented.

Three vibration sensors 31a–31c made of piezoelectric elements are arranged at corners of the document table 12 to detect the input vibration. Output signals of the vibration sensors 31a–31c are supplied to a detector 34.

Figure 3:
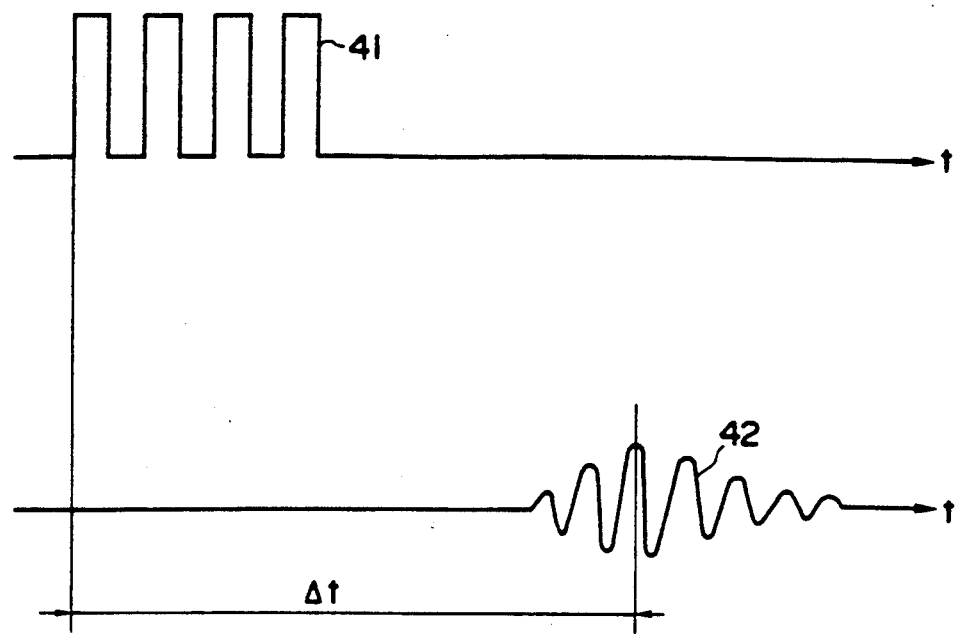
FIG. 3 shows waveforms for explaining an operation of the unit of FIG. 2.
Figure 4:
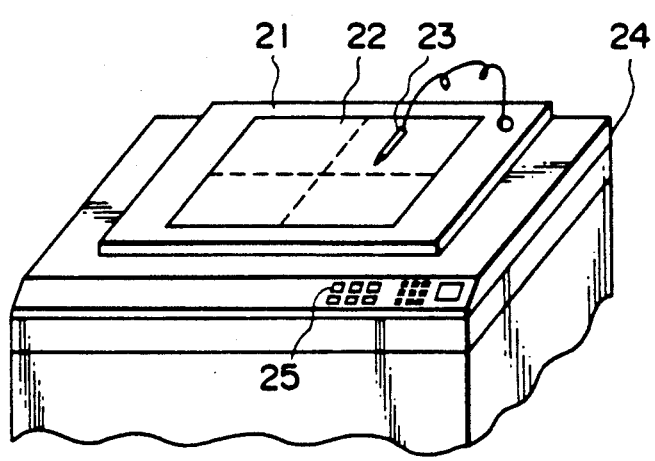
FIG. 4 shows a prior art copying machine as an image processing apparatus.

The detector 34 comprises a phase waveform processor and a clock circuit and it detects a vibration transmission time on the document table 12. As shown in FIG. 3, the vibrator of the input pen 13 is driven by a pulse 41 of a pen drive signal. The vibration changes into a waveform 42 of a detection signal while it is being transmitted through the horn of the pen and the document table 12 and it is detected by the vibration sensors 31a–31c. A vibration transmission time Δt is required depending on a distance between a vibration input point and the sensor. As shown in FIG. 3, t is measured from the initiation of signal 41 until the greatest peak of signal 42 has arrived at the detector.

The detector 34 and driver 35 are synchronized by an operation control circuit 36 which may be a microcomputer. The operation control circuit 36 has a register 36a for storing coordinate data. The operation control circuit 36 determines a straight distance between the sensor and the vibration input point based on the vibration transmission time data supplied from the detector 34. The straight distance d between the sensor and the input point is given by $$d = \Delta t \cdot v \qquad (1)$$

where v is a velocity of the vibration on the document table 12.

The operation control circuit 36 further detects the input point coordinates of the input pen 13 based on the straight distance data in accordance with a principle of triangulation. By setting the vibration sensor 31a as an origin point and setting X and Y axes as shown in FIG. 2, the input coordinate P(x,y) are represented by $$x = X/2 + (d1 + d2)(d1 - d2)/2X \qquad (2)$$

$$y = Y/2 + (d1 + d3)(d1 - d3)/2Y \qquad (3)$$

where X and Y are distances between the sensor 31a and the sensors 31b and 31c, respectively, and d1–d3 are distances between the input point and the vibration sensors 31a-31c, respectively, determined by the formula (1).

The operation control circuit 36 generates area designation data based on the coordinate data and supplied the data to a main control unit of the apparatus through an input/output port 37. The main control unit controls an image input condition in accordance with the input data. For example, it determines an area of the document sheet 16 to be copied.

A configuration of the copying machine will be now explained. Numeral 54 denotes a main body. When a CPU 41 receives coordinate data from the input/output port 37 of the coordinate input unit, the CPU 51 sequentially stores the coordinate data into a RAM 52. Numeral 40 denotes a ROM which stores a control program shown in a flow chart of FIG. 5.

The CPU 51 controls the copying machine 43 in accordance with the control program.

Figure 5:
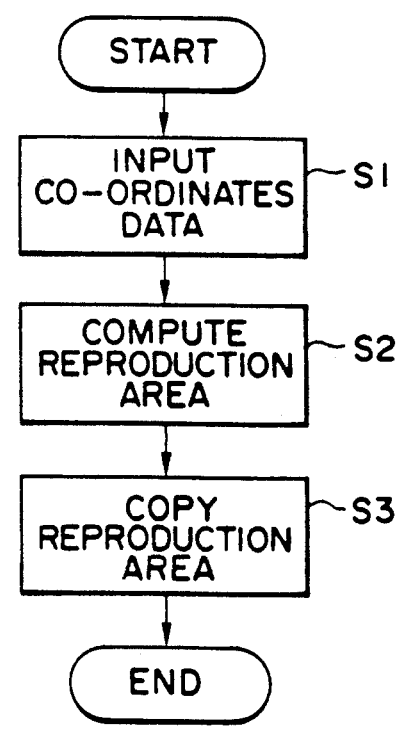
FIG. 5 shows a flow chart of an image processing procedure.
Figure 6:
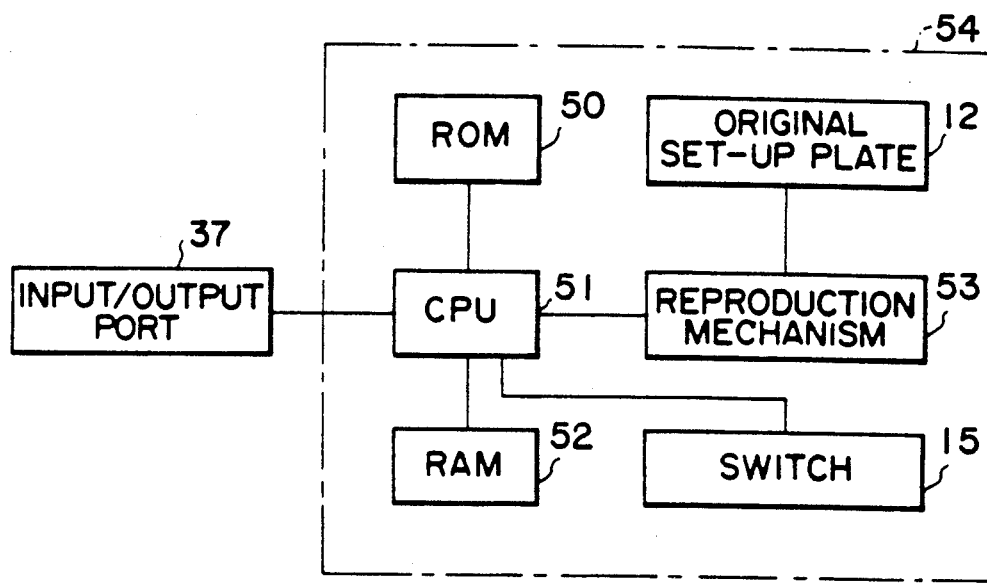
FIG. 6 shows a configuration of a copying machine.

The operation of the image processing to reproduce only the designated area by the copying machine is described. FIG. 5 shows processes of the operation control circuit 36 and main control unit.

When an operator is to designate an area of the document sheet 16 to be reproduced, he/she inputs a command for area designation through the switch 15, lifts up the pressure plate 11 as shown in FIG. 1, and places the document sheet 16 face-up at a predetermined position on the document table 12.

Then, he/she points desired points on the document sheet 16 by the input pen 13 to designate the area. For example, the reproduction area may be designated by inputting coordinates of two diagonal points or four corner points of a rectangular area.

The vibration of the input pen 13 is input to the document table 12 through the document sheet 16 and it is transmitted to the sensors 31a-31c of the document table 12. Since the document table 12 is designed to transmit a plane wave, the transmission of the vibration is not impeded by the placement of the document sheet, and the vibration having sufficient intensity for coordinate detection is transmitted to the vibration sensors 31a-31c. The operation control circuit 36 stores the coordinate data read in the step S1 of FIG. 5 into the register 36a.

The coordinate data is sent to the main control unit through the register 36a and input/output port 37, and the area to be reproduced is recognized by the main control unit in a step S2.

Thereafter, the document sheet is placed face-down on the document table 12, pressed by the pressure plate 11, a start command is issued by the switch 15 and the reproduction operation is started.

In a step S3, the main control unit controls the known copying machine to reproduce the designated area. When an electrographic system is used, unnecessary image area may be exposed so that the reproduction is made only in the designated area.

In accordance with the present embodiment, the coordinates for designating the image area can be input by merely turning over the document sheet. Since the area can be designated on the document table 12, a possibility of positional offset of the document sheet when the area is designated and when the image is input is low and an area designation error is small. Accordingly, correct image processing is attained.

In accordance with the present embodiment, a separate digitizer need not be provided and the area designation member is shared by the document table of the image input unit so that the number of parts is reduced. Accordingly, a manufacturing cost of the apparatus is saved.

The present invention is applicable to any image processing apparatus such as copying machine, facsimile machine and image data processing machine.

In accordance with the present invention, in the image processing apparatus which has means for designating the area of document image and carries out the predetermined process to the area designated by the designation means when the document image is input, the document area designation means comprises the document table at the image input unit made of a transparent and vibration-transmitting plate and the coordinate input means for detecting the coordinates of the vibration input point by detecting the vibration input to the document table by the vibration sensors arranged in the document table. Since the document table is shared by the coordinate input means, the operation to process the image is significantly simplified and the manufacturing cost of the apparatus can be reduced.

We claim:

1. An image processing apparatus having a main body and comprising:
   a transparent document table attached to said main body for carrying a document to be reproduced on a top surface thereof;
   a vibration generator having a vibrator for generating a vibration wave that is transmitted to said document table in response to a plurality of drive pulses;
   a vibration detector arranged on said document table for detecting the vibration wave being transmitted through said document table;
   operation means for calculating a coordinate position of said vibration generator based on an arrival time of the greatest peak of the vibration wave detected by said vibration detector; and reproduction control means for reading the document from the direction of a lower surface of said document table and for reproducing a portion of the document corresponding to the coordinate position calculated by said operation means.

2. An image processing apparatus according to claim 1 wherein said document table comprises an acrylic plate.

3. An image processing apparatus according to claim 1 wherein said document table comprises a glass plate.

4. An image processing apparatus according to claim 1, wherein said vibration generator has a pen-like shape.

5. An image processing apparatus capable of supporting a document to be reproduced on a top surface of a transparent plate-like member, reading a document image from an underside direction of said plate-like member and reproducing said document image, comprising:

vibration detection means arranged on said plate-like member;

vibration generation means having a vibrator for generating a vibration wave and transmitting the vibration wave to said plate-like member when said vibration generation means applies a plurality of drive pulses to said vibrator and is in contact with said plate-like member;

operation means for calculating data related to a contact position of said vibration generation means on the basis of an arrival time of the greatest peak of the vibration wave detected by said vibration detection means; and interface means for outputting an area corresponding to the contact position data calculated by said operation means to said image processing apparatus, wherein said image processing apparatus reproduces a portion of a document image based on the area output by said interface means.

6. An image processing apparatus according to claim 5 wherein said plate-like member comprises an acrylic plate.

7. An image processing apparatus according to claim 5 wherein said plate-like member comprises a glass plate.

8. An image processing apparatus according to claim 5 wherein said vibration generation means has a pen-like shape.

9. An image processing apparatus according to claim 5 further comprising memory means for storing the contact position data calculated by said operation means.

* * * * *